United States Patent
Cansell

(10) Patent No.: US 9,073,769 B2
(45) Date of Patent: Jul. 7, 2015

(54) PROCESS FOR TREATING WASTE VIA HYDROTHERMAL TREATMENT

(75) Inventor: Francois Cansell, Pessac (FR)

(73) Assignee: INNOVEX (FR)

( * ) Notice: Subject to any disclaimer, the term of this patent is extended or adjusted under 35 U.S.C. 154(b) by 69 days.

(21) Appl. No.: 13/979,224

(22) PCT Filed: Jan. 9, 2012

(86) PCT No.: PCT/EP2012/050248
§ 371 (c)(1), (2), (4) Date: Oct. 29, 2013

(87) PCT Pub. No.: WO2012/095391
PCT Pub. Date: Jul. 19, 2012

(65) Prior Publication Data
US 2014/0051903 A1    Feb. 20, 2014

(30) Foreign Application Priority Data
Jan. 12, 2011    (FR) .................................. 11 50247

(51) Int. Cl.
| | |
|---|---|
| *A62D 3/38* | (2007.01) |
| *C02F 1/72* | (2006.01) |
| *C02F 11/08* | (2006.01) |
| *B01J 19/24* | (2006.01) |
| *C02F 11/06* | (2006.01) |
| *C02F 101/30* | (2006.01) |
| *C02F 103/32* | (2006.01) |
| *C02F 103/34* | (2006.01) |

(52) U.S. Cl.
CPC .................. *C02F 1/72* (2013.01); *C02F 11/086* (2013.01); *C02F 2101/30* (2013.01); *C02F 2103/32* (2013.01); *C02F 2103/34* (2013.01); *C02F 2209/001* (2013.01); *C02F 2209/08* (2013.01); *C02F 2209/29* (2013.01); *C02F 2301/066* (2013.01); *C02F 2303/08* (2013.01); *C02F 1/727* (2013.01); *C02F 2209/05* (2013.01); *B01J 19/2415* (2013.01); *C02F 11/06* (2013.01)

(58) Field of Classification Search
CPC ........................................................ A62D 3/38
USPC ......................................... 588/320, 321, 405
See application file for complete search history.

(56) References Cited

U.S. PATENT DOCUMENTS

| | | |
|---|---|---|
| 5,720,889 A | 2/1998 | McBrayer, Jr. et al. |
| 6,051,145 A | 4/2000 | Griffith et al. |

FOREIGN PATENT DOCUMENTS

WO    0220414 A1    3/2002

OTHER PUBLICATIONS

Sánchez-Oneto J, Portela Miguélez Jr, García-Jarana MB: "Direct injection of oil waste in a supercritical water oxidation reactor at pilot plant scale", Proceedings of 11th European Meeting on Supercritical Fluids 2008, 2008, XP002642930, Extrait de I'Internet: URL:http://www.isasf. net/fileadmin/files/Docs/Barcelona/ISASF%202008/PDF/Oral%20communications/OC_PR_12.pdf.

*Primary Examiner* — Edward Johnson
(74) *Attorney, Agent, or Firm* — Cantor Colburn LLP

(57) ABSTRACT

Hydrothermal oxidation of organic compounds, optionally with oxidizable inorganic compounds, is contained in an aqueous effluent. The aqueous effluent is injected within a tubular reactor and brought to supercritical pressure, and temperature is increased to a supercritical temperature, without any intermediate decrease in temperature, by introducing sufficient amounts of oxidizing agent within the tubular for totally oxidizing the organic compounds, and optionally for partly oxidizing oxidizable inorganic compounds. The oxidizing agent is introduced in a fractionated way in several points increasingly located downstream, and the composition and/or the concentration of the organic compounds and/or oxidizable organic compounds within the effluent to be treated varies over time. Further, upstream from the tubular reactor where oxidation is carried out, the effluent's total chemical oxygen demand of the effluent to be treated is measured and monitored at more than 120 grams/liter (g/L) and less than 250 g/L prior to injecting the tubular reactor.

15 Claims, No Drawings

PROCESS FOR TREATING WASTE VIA HYDROTHERMAL TREATMENT

This application is a U.S. national phase application filed pursuant to 35 U.S.C. §371 and claims benefit of PCT Patent Application No. PCT/EP2012/050248, filed Jan. 9, 2012, and French Patent Application 11 50247, filed Jan. 12, 2011.

The present invention relates to a process for hydrothermal oxidation of waste contained in an aqueous effluent. The invention in particular relates to the treatment of aqueous effluents comprising organic waste and/or dissolved salts.

Multiple processes for transformation of aqueous effluents of this type have been described, among which mention may in particular be made of those in which the effluent to be treated is placed in the presence of an oxidizing agent under so-called "hydrothermal" conditions, i.e. at temperatures and pressures such that water exceeds its critical point (pressure of more than 221 bars ($2.21.10^3$ Pa) and temperature above 374° C.), which leads to oxidation of the waste. In the case of organic compounds, the treatment typically leads to oxidation in the form of simple compounds such as $CO_2$ and $H_2O$. The salts of metals other than alkaline and earth alkaline metals, as for them, are typically converted into metal (hydr)oxides. A process of this type, which proves to be particularly important, is described in WO 02/20414, which allows control of the rise in temperature produced during hydrothermal oxidation. In the process described in this document, the effluent is treated within a tubular reactor by introducing the oxidizing agents not in one go but gradually along the tubular reactor, in several injection points more and more downstream from the flow of the effluent, which allows a gradual increase in the temperature of the flow according to an increasing curve, from a non-supercritical initial temperature (for example of the order of room temperature or above) up to a supercritical temperature. This process said to be "with multi-injection of the oxidizing agent" allows the oxidation to be achieved in a controlled way, by avoiding too intense production of energy which would otherwise damage the walls of the reactor, and nevertheless efficiently, notably taking into account the fact that the rise in temperature is carried out in a continuous and strictly increasing way (which, inter alia, has the advantage of not inducing sudden drops in temperature which may be observed with processes wherein the temperature is controlled by feedback with additions of coolants, which are able to inhibit the oxidation reaction by phenomena of the quenching type).

Moreover, a process for hydrothermal oxidation of organic compounds such as oily waste contained in an aqueous effluent has been described, the aqueous effluent being injected in a tubular reactor, in the presence of an oxidizing agent, and brought to a supercritical pressure and to a supercritical temperature. The initial COD of the aqueous effluents before introduction into the reactor is measured (J. Sanchez-Oncto et al., Proceedings of 11th European Meeting on Supercritical Fluids 2008).

An object of the present invention is thus to improve the process described in WO 02/20414, notably so as to make it well adapted to an industrial application where the nature and concentration of the effluents may vary to a very great extent over time.

For this purpose, the present invention proposes modification of the process of WO 02/20414 by analyzing the amount of compounds to be treated in the effluent to be treated, and of optionally other parameters such as the concentration of halide ions or of salts, and by adjusting, if need be, these parameters upstream from the hydrothermal treatment reactor prior to oxidation by multi-injection.

More specifically, the object of the present invention is a process for hydrothermal oxidation of organic compounds contained in an aqueous effluent, optionally with oxidizable inorganic compounds, wherein said aqueous effluent is injected within a tubular reactor wherein the effluent is brought to a supercritical pressure (i.e. above 221 bars i.e. $2.21.10^3$ Pa) and wherein the temperature of the effluent is gradually increased from its initial temperature up to a supercritical temperature (above 374° C.), designated by $T_{final}$, without any intermediate temperature reduction during the increasing time-dependent change up to $T_{final}$, by introducing within said tubular reactor a sufficient amount of oxidizing agent for totally oxidizing the organic compounds and optionally for at least partly oxidizing the oxidizable inorganic compounds, the oxidizing agent being introduced in a fractionated way in several points located increasingly downstream from the reactor, characterized in that the composition and/or the concentration of the organic compounds and/or of the oxidizable inorganic compounds within the effluent to be treated varies over time, and in that, upstream from the tubular reactor wherein oxidation is carried out, the TOD of the effluent to be treated is measured and maintained or adjusted if required to a value of less than 250 g/L.

According to the invention, the TOD of the effluent to be treated is measured, maintained or adjusted if required, to a value of more than 120 g/L and of less than 250 g/L, prior to its injection into the tubular reactor.

Advantageously, the TOD of the effluent to be treated is measured, maintained or adjusted if required to a value comprised between 130 and 240 g/L, preferably between 130 and 220 g/L, advantageously between 140 and 220 g/L, prior to its injection into the tubular reactor.

By "TOD", is meant here the total chemical oxygen demand of the effluent to be treated, expressed in mol/L, which corresponds to the total amount of oxygen (expressed in moles) required for carrying out complete oxidation of the organic and oxidizable inorganic compounds present within 1 liter of the effluent. This total chemical demand "TOD" takes into consideration the totality of the present oxidizable species, i.e. both the organic compounds and, if necessary, the optionally present oxidizable inorganic compounds. This is distinguished from the "COD" (chemical oxygen demand) which only considers organic species. The TOD is equal to the COD when the oxidizable inorganic species are absent.

In the case when the effluent to be treated only contains organic compounds, excluding oxidizable inorganic compounds, the TOD of the effluent is preferably maintained or adjusted between 150 and 220 g/L before injection into the tubular reactor.

Conversely, when the effluent to be treated contains oxidizable inorganic compounds (notably oxidizable metal compounds), it is most often preferable that the TOD be maintained or adjusted to a value equal to or below 220 g/L, more preferentially between 120 and 200 g/L, more preferentially above 120 g/L.

Generally, it proves to be most often interesting that the TOD of the effluent be maintained or adjusted between 150 and 200 g/L before injection into the tubular reactor.

Monitoring the TOD of the effluent to be treated below 250 g/L before its introduction into the oxidation tubular reactor, as this is carried out according to the invention, inter alia has the advantage of inhibiting a too large rise in the operating temperature of the reactor, which may otherwise lead to it being damaged. Consequently, the application of the invention is expressed by unquestionable advantages in terms of safety and perpetuation of the equipment and therefore of upkeep and maintenance cost.

Moreover, monitoring of the TOD in the aforementioned ranges allows optimum treatment of the waste to be treated, the TOD being sufficiently low for allowing effective and total oxidation—or substantially total oxidation—of the species to be treated (organic compounds and/or oxidizable inorganic compounds). Further, monitoring the TOD above 4 120 g/L gives the possibility of inducing within the oxidation tubular reactor a sufficient operating temperature in order not to consume the oxidizing agent unnecessarily.

In other words, the application of the conditions of the present invention allows a particularly interesting optimization of the safety, efficiency and costs of the installation for treating waste and for its maintenance.

The measurement of the TOD of the effluent and, if need be, the modification of this TOD may be carried out according to any means known per se. The measurement of the TOD may notably be carried out by means of a usual TOD-meter or COD-meter, for example of the type described in the NFEN1484, ISO8254, EPA4151 standards. It is notably possible to use COD/TOD analyzers of the type marketed by ANAEL.

Modulation of the TOD may, as for it, be obtained:
  if the TOD measured upstream from the reactor is too high:
    by dilution, for example with water or with another less concentrated effluent; and
  if the TOD measured upstream from the reactor is too low:
    by concentration, for example by adding organic and/or inorganic waste or a more concentrated effluent into the effluent to be treated.

Typically, for applying the present invention, upstream from the oxidation reactor, a device for analyzing and preparing the effluent to be treated is applied, which typically includes from the upstream to downstream side:
  an area for analysis (and optionally storage) of the effluent to be treated, provided with means for analyzing the TOD of the effluent;
  an area for adjusting the TOD, provided with means for supplying the medium contained in the analysis area, and with means allowing the dilution or concentration of the medium contained in the adjustment area (typically, this adjustment area is a tank provided with means for supplying water (for dilution) or waste or a concentrated effluent (for concentration)); and
  means for bringing the adjusted medium in the adjustment area to the oxidation reactor.

According to preferential embodiments which further improve the significance of the process, the process of the invention may have at least one of the additional features described hereafter:

Preferably, in addition to the monitoring of the TOD, it is possible to measure and adjust, if need be, other parameters of the effluent to be treated.

Thus, according to a specific embodiment, upstream from the tubular reactor wherein oxidation is carried out, the halogen concentration is measured in the effluent and is maintained or adjusted if required to a value of less than 2 g/L and preferably less than 1 g/L.

By limiting the halogen content, it is possible inter alia to inhibit the deterioration of the reactor by corrosion, which is there again expressed by advantages in terms of safety and cost reduction.

If necessary, the measurement of the halogen concentration may typically be conducted according to the ISO9562 standard for the assay of halogens in absorbable organic compounds (AOX) and by analysis with inductively coupled plasma mass spectroscopy (ICP-MS). The adjustment of the concentration may be carried out by diluting the effluent (by adding water or another more diluted effluent).

According to another specific embodiment, compatible with the previous one, upstream from the tubular reactor wherein oxidation is carried out, the concentration of salts in the effluent to be treated is measured, maintained or adjusted if required to a value of less than 10 g/L and preferably less than 5 g/L.

By this limitation of the salt content, it is possible inter alia to inhibit or even totally avoid fouling phenomena of the tubular reactor.

If necessary, the measurement of the salt concentration may typically be carried out by measuring the ion conductivity of the medium. The adjustment of the concentration may be carried out by diluting the effluent (there again, by adding water or another more diluted effluent).

As regards the oxidation reaction within the tubular reactor and its preferential embodiments, reference may be made to the application WO 02/20414 which details these aspects.

The process of the invention is well adapted to the treatment of most aqueous effluents, in particular urban sludges and effluents stemming from basic and transformation industries, particularly effluents from agri-food, papermaking, chemical, pharmaceutical, refining, petroleum, mechanical, metallurgical, aeronautical and nuclear industries.

The invention will be further illustrated by the illustrative examples given hereafter.

EXAMPLE 1

Assessment of the Efficiency of the Process According to the Invention for Treating Waste from the Chemical Industry In order to illustrate the importance of the process of the present invention, hydrothermal oxidation of a waste was achieved by applying the device described in WO 02/20414 under different conditions, discussed hereafter. The embodiments 1 and 2 correspond to the application according to the invention and the two following ones are given as a comparison.

The treated waste is a waste from the chemical industry only containing compounds based on the C, H and O elements (a mixture essentially comprising alkanes, alcohols and organic acids of the fatty acid type). From this waste, an aqueous medium is made, the TOD of which was monitored and controlled upstream from the oxidation reactor, in order to attain at the inlet of the reactor a TOD value, a so-called "initial TOD", the values of which are given hereafter. The mixture was preheated at the inlet of the reactor, and then injected into the reactor wherein multiple injection of oxygen was carried out in three increasingly downstream points. The first injection causes a rise in temperature of the medium to a temperature $T_1$, the second to a temperature $T_2$ and the third to a temperature $T_3$, according to an increasing temperature profile (with never any temperature decrease). The TOD of the flow at the outlet of the reactor was measured, a so-called "final TOD".

Embodiment 1
  initial TOD=180 g/l
  Injection temperature: 250° C.
  $T_1$=360° C.
  $T_2$=450° C.
  $T_3$=550° C.

According to this illustrative embodiment of the present invention, efficient conversion of the waste is obtained, with a final TOD equal to 30 mg/l, with control of the rise in temperature.

Embodiment 2
  initial TOD=140 g/l
  Injection temperature: 340° C.
  T1=370° C.
  T2=450° C.
  T3=530° C.

According to this illustrative embodiment of the present invention, efficient conversion of the waste is obtained with a final TOD equal to 110 mg/l, with control of the rise in temperature.

Embodiment 3
  initial TOD=120 g/l
  Injection temperature: 250° C.
  T1=340° C.
  T2=350° C.
  T3=365° C.

According to this embodiment, wherein the TOD is lower than the one recommended according to the invention, the final TOD is 25 g/l±5 g/l, which is too high, and does not allow sufficient treatment of the waste (the TOD of the rejected waste is too high).

Embodiment 4
  initial TOD=250 g/l
  Injection temperature: 250° C.
  T1=360° C.
  T2=450° C.
  T3=580° C.

According to this embodiment, wherein the TOD is higher than the one recommended according to the invention, the final TOD is 65 g/l±5 g/l, which is too high. The embodiment with a TOD of 250 g/L further corresponds to a limit at which the temperature becomes too high, and leading to a risk of deterioration of the reactor.

EXAMPLE 2

Assessment of the Efficiency of the Process According to the Invention for Treating Waste from a Distillery The treated waste is a waste from a distillery consisting of alcohol derivatives and sugar deliverances in majority. From this waste, an aqueous medium was made, the TOD of which was monitored and controlled upstream from the oxidation reactor in order to obtain at the inlet of the reactor a TOD value, a so-called "initial TOD", the value of which is given hereafter. The mixture was preheated at the inlet of the reactor, and then injected into the reactor wherein multiple injection of oxygen was carried out in three increasingly downstream points. The first injection causes a rise in temperature of the medium to a temperature T1, the second to a temperature T2 and the third to a temperature T3, according to an increasing temperature profile (with never any decrease in temperature). The TOD of the flow was measured at the outlet of the reactor, a so-called "final TOD".

Initial TOD: 220 g/l
  Injection temperature: 200° C.
  T1=370° C.
  T2=450° C.
  T3=570° C.

According to this illustrative embodiment of the present invention, efficient conversion of the waste is obtained, with a final TOD equal to 100 mg/l, with control of the rise in temperature.

The invention claimed is:

1. A process for hydrothermal oxidation of organic compounds contained in an aqueous effluent, optionally with oxidizable inorganic compounds, wherein said aqueous effluent is injected within a tubular reactor wherein the effluent is brought to a supercritical pressure and wherein the temperature of the effluent is gradually increased from its initial temperature up to a supercritical temperature, designated by $T_{final}$, without any intermediate decrease in temperature during the increasing time-dependent change up to $T_{final}$, by introducing within said tubular reactor a sufficient amount of oxidizing agent for totally oxidizing the organic compounds and optionally for at least partly oxidizing oxidizable inorganic compounds, the oxidizing agent being introduced in a fractionated way into several points increasingly located downstream from the reactor,
  characterized in that the composition and/or the concentration of the organic compounds and/or oxidizable inorganic compounds within the effluent to be treated varies over time, and in that, upstream from the tubular reactor wherein oxidation is carried out, the TOD of the effluent to be treated is measured and maintained or adjusted if required, to a value of more than 120 g/L and of less than 250 g/L prior to its injection into the tubular reactor.

2. The process according to claim 1, wherein, upstream from the tubular reactor wherein oxidation is carried out, the TOD of the effluent to be treated is measured, maintained or adjusted if required, to a value comprised between 130 and 240 g/L, prior to its injection into the tubular reactor.

3. The process according to claim 1, wherein the effluent to be treated contains only organic compounds, excluding oxidizable inorganic compounds, and wherein the TOD of the effluent is maintained or adjusted between 150 and 220 g/L before injection into the tubular reactor.

4. The process according to claim 1, wherein the effluent to be treated contains oxidizable inorganic compounds, and wherein the TOD of the effluent is maintained or adjusted to a value of more than 120 g/L and of less than or equal to 220 g/L, before injection into the tubular reactor.

5. The process according to claim 1, wherein the TOD of the effluent is maintained or adjusted between 150 and 200 g/L before injection into the tubular reactor.

6. The process according to claim 1, wherein, upstream from the oxidation reactor, a device for analysis and preparation of the effluent to be treated is applied, which typically includes from the upstream to downstream side:
  an area for analysis of the effluent to be treated, provided with means for analyzing the TOD of the effluent;
  an area for adjustment of the TOD, provided with means for supplying the medium contained in the analysis area and with means allowing dilution or concentration of the medium contained in the adjustment area, and
  means for bringing the adjusted medium in the adjustment area to the oxidation reactor.

7. The process according to claim 1, wherein, upstream from the tubular reactor wherein oxidation is carried out, the halogen concentration in the effluent to be treated is measured and maintained or adjusted if required, to a value of less than 2 g/L and preferably less than 1 g/L.

8. The process according to claim 1, wherein, upstream from the tubular reactor wherein oxidation is carried out, the concentration of salts in the effluent to be treated is measured and maintained or adjusted if required, to a value of less than 10 g/L.

9. The process according to claim 1, wherein the treated effluent is an aqueous effluent selected from urban sludges and effluents from basic and transformation industries.

10. The process according to claim 9, wherein the treated effluent is an aqueous effluent from agri-food, papermaking, chemical, pharmaceutical, refining, petroleum, mechanical, metallurgical, aeronautical or nuclear industries.

11. The process according to claim 1, wherein, upstream from the tubular reactor wherein oxidation is carried out, the TOD of the effluent to be treated is measured, maintained or adjusted if required, to a value comprised between 130 and 220 g/L, prior to its injection into the tubular reactor.

12. The process according to claim 1, wherein, upstream from the tubular reactor wherein oxidation is carried out, the TOD of the effluent to be treated is measured, maintained or adjusted if required, to a value comprised between 140 and 220 g/L, prior to its injection into the tubular reactor.

13. The process according to claim 2, wherein the effluent to be treated contains oxidizable inorganic compounds, and wherein the TOD of the effluent is maintained or adjusted to a value of more than 120 g/L and of less than or equal to 220 g/L, before injection into the tubular reactor.

14. The process according to claim 1, wherein, upstream from the tubular reactor wherein oxidation is carried out, the halogen concentration in the effluent to be treated is measured and maintained or adjusted if required, to a value of less than 1 g/L.

15. The process according to claim 1, wherein, upstream from the tubular reactor wherein oxidation is carried out, the concentration of salts in the effluent to be treated is measured and maintained or adjusted if required, to a value of less than 5 g/L.

\* \* \* \* \*